(No Model.) 2 Sheets—Sheet 1.
J. F. BENGERT.
BICYCLE HOLDER.
No. 587,917. Patented Aug. 10, 1897.
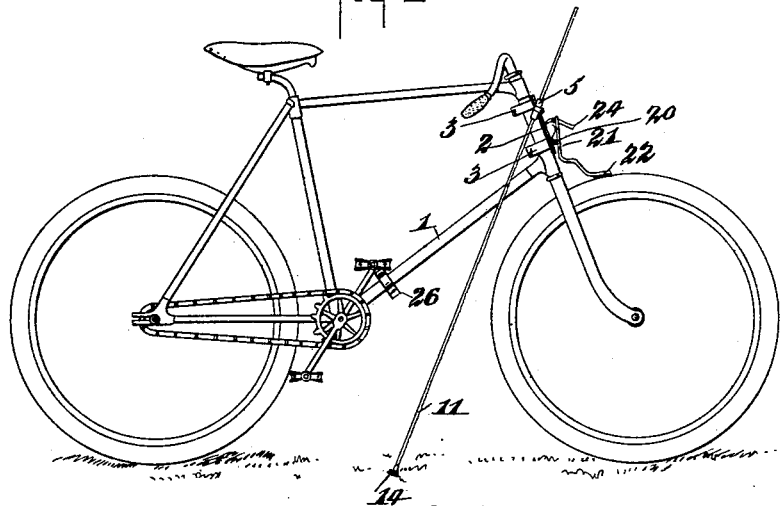
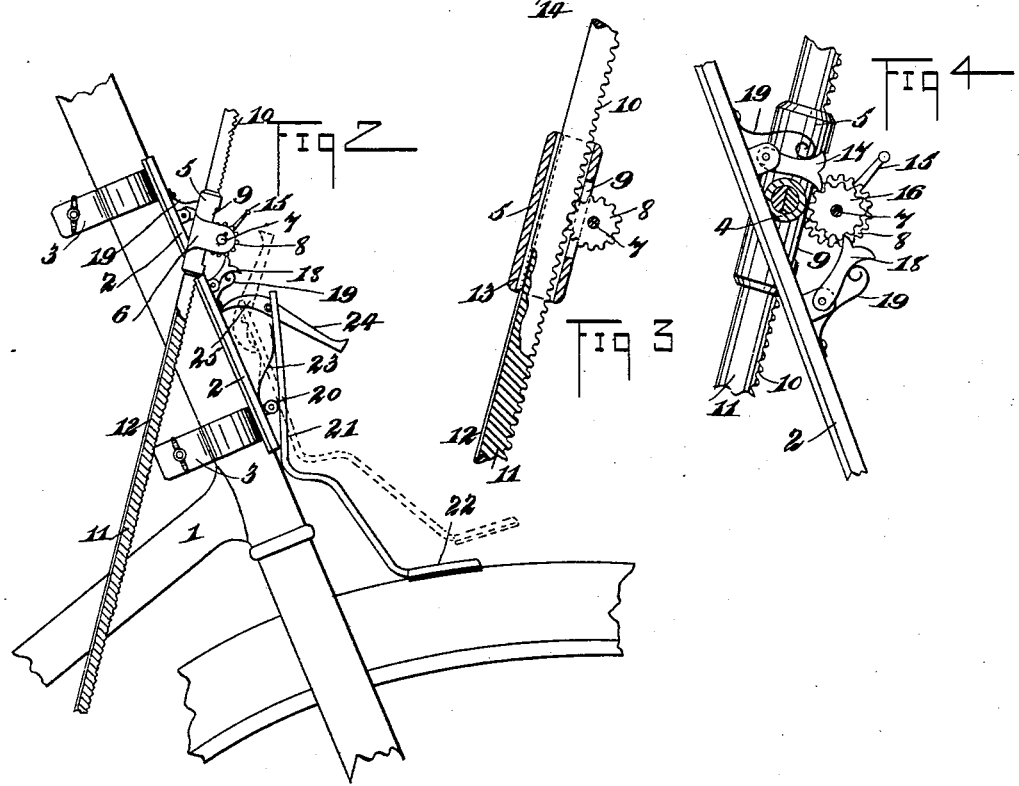
WITNESSES:
INVENTOR
J. F. Bengert
BY
Munn & Co
ATTORNEYS.

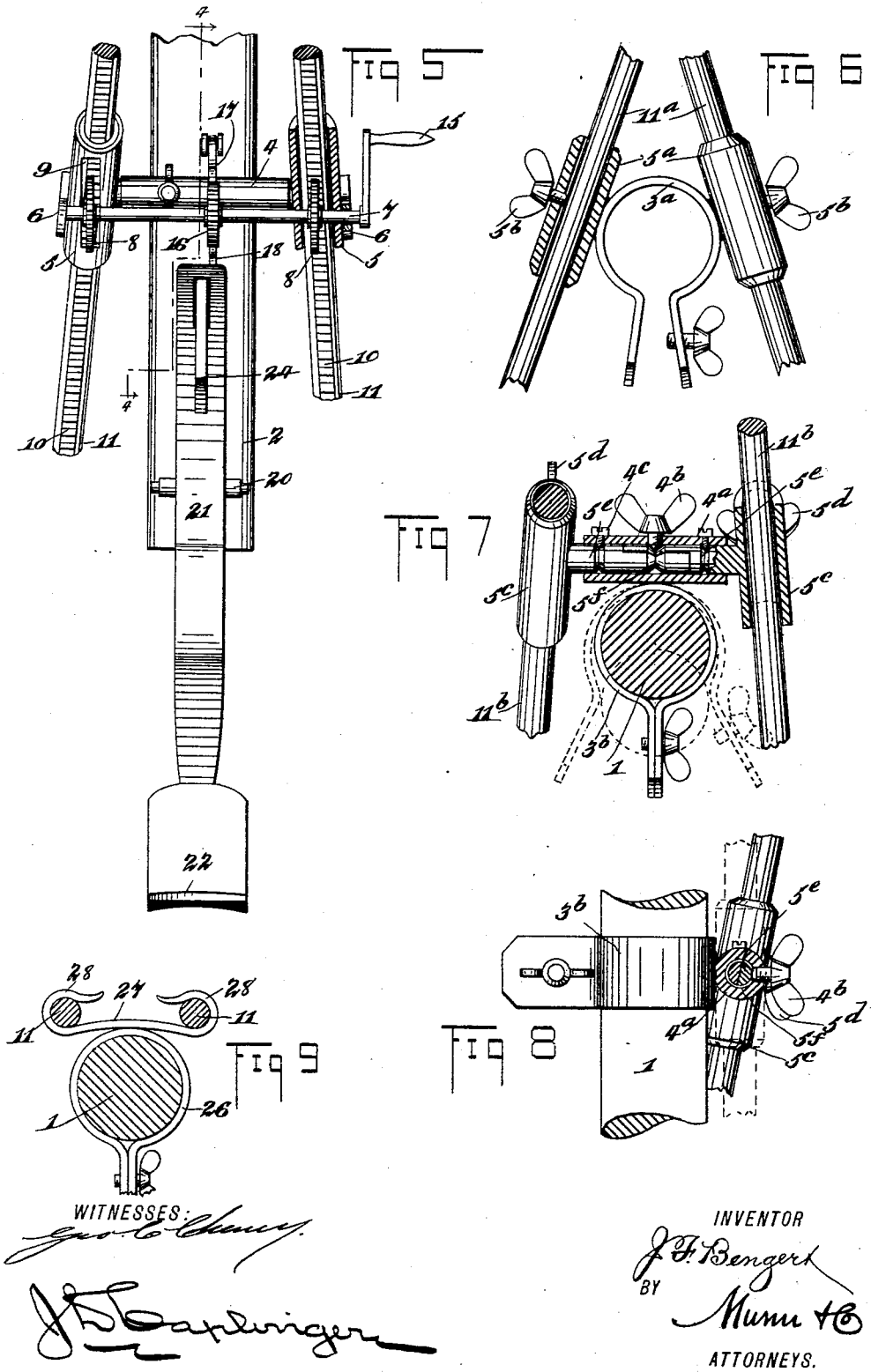

UNITED STATES PATENT OFFICE.

JOHN F. BENGERT, OF BROOKLYN, NEW YORK.

BICYCLE-HOLDER.

SPECIFICATION forming part of Letters Patent No. 587,917, dated August 10, 1897.

Application filed September 11, 1895. Serial No. 562,122. (No model.)

*To all whom it may concern:*

Be it known that I, JOHN F. BENGERT, of Brooklyn, in the county of Kings and State of New York, have invented certain new and useful Improvements in Bicycle-Holders, of which the following is a full, clear, and exact description.

This invention relates to certain improvements in bicycle-holders such as are employed for supporting bicycles in an erect position when not in use; and the object of the invention is to provide a device of this character of a simple and inexpensive construction adapted to be secured in place on the bicycle, so as to be ready for use whenever the rider desires to dismount.

The invention contemplates certain novel features of the construction, combination, and arrangement of the various parts of the device, whereby certain important advantages are attained, and the device is made simpler, cheaper, and otherwise better adapted and more convenient for use than various other devices heretofore employed for this purpose, all as will be more fully hereinafter set forth.

The novel features of the invention will be carefully defined in the claims.

Reference is to be had to the accompanying drawings, forming a part of this specification, in which similar characters of reference indicate corresponding parts in all the figures.

Figure 1 is a general view drawn to a small scale and showing a bicycle provided with a holder constructed according to my invention. Fig. 2 is a fragmentary detail side view drawn to a larger scale and showing the clamp arranged on the steering-head and the means for adjustably securing the rods or legs thereto. Fig. 3 is a sectional view taken through one of the bearings, showing the rod in place therein. Fig. 4 is a sectional view taken through the clamp on the line 4 4 in Fig. 5 and showing the adjusting devices of the legs or rods in elevation. Fig. 5 is a front view of the parts shown in Fig. 2. Fig. 6 is a fragmentary view somewhat similar to Fig. 5, but showing a modified arrangement of the parts. Fig. 7 is a horizontal sectional view showing still another modified arrangement of the device. Fig. 8 is a vertical sectional view showing certain features of construction of the device as shown in Fig. 7, and Fig. 9 is an enlarged detail view showing a clip adapted to be secured to the bicycle-frame in position to hold the legs or rods out of operative position.

In the views, 1 represents the frame of the bicycle, which may be of any kind, and 2 represents the clamping-frame of the device, having clamp-collars 3 3 secured to its lower and upper parts and adapted to encircle the frame-bars. As shown in Fig. 1, said clamp-frame 2 is secured in an upright position along the front face of the steering-head of the bicycle, but it will be evident that it may as well be secured in any other position on the frame of the bicycle.

At about the central portion of its outer or front face the frame 2 is provided with a transverse tubular bearing-piece 4, in which are held to turn lugs projecting from the inner sides of the tubular bearing sleeves or pieces 5, provided on their outer sides with forwardly-projecting lugs 6, correspondingly perforated and forming bearings for a transverse shaft 7, having gear-wheels or pinions 8 fixed on its ends and arranged to pass through slots 9, extending longitudinally of the bearing-sleeves 5, into engagement with rack-surfaces 10, formed longitudinally in the front faces of rods 11, forming the legs or supporting-bars of the holder.

The rods 11 are provided at their rear sides with longitudinal grooves 12, arranged to be engaged by keys 13, projecting interiorly in the sleeves 5, so that said rods are held with their rack-faces 10 in engagement with the gear-wheels 8 when moved longitudinally, and at their lower ends said rods 11 are formed with sockets 14, arranged to receive plugs of rubber or equivalent material, forming feet adapted to rest on the floor or ground to support the bicycle in an erect position, as shown in Fig. 1.

The shaft 7 is provided at one end with a crank or handle 15, and at its central portion with a ratchet or gear wheel 16, having teeth arranged to be engaged by pawls or dogs 17 and 18, located, respectively, above and below said shaft 7 on the clamp-frame 2 and adapted to hold said shaft against rotative movement, being held by springs 19 in normal engagement with the teeth of said wheel.

The bearing-sleeves 5 are set slightly at angles to each other, so that when the legs or rods 11 are in their lowered position, as shown in Figs. 1 and 5, they will stand inclined to each other in order to better support the bicycle, and when the device is in use in order to prevent endwise movement of the bicycle I provide a brake device, which I will now describe, located on the clamp-frame 2 and adapted to engage the wheel-tire to hold the same from turning.

The clamp-frame 2 has pivoted at its lower part, as seen at 20 in the drawings, a lever 21, the lower end of which is bent and provided with a brake-shoe 22, arranged to engage the wheel-tire when said lever is swung on its pivot-point 20, and said lever 21 is normally held out of operative position, as indicated in dotted lines in Fig. 2, by means of a spring 23, connected to the clamp-frame 2. At the upper end of the lever 21 is pivoted a dog or latch 24, having its inner end 25 arranged to engage the front face of the clamp-plate 2, when the said dog or latch is swung on its pivot in such a way as to force the said shoe 22 on lever 21 into engagement with the wheel-tire, as will be readily understood.

As stated above, the sleeves 5 are provided with lugs arranged to turn in the tubular bearing 4 of clamp-frame 2, and said sleeves 5, being connected by shaft 7, turn in unison in order to permit the legs or rods 11 to be raised and folded alongside the frame 1 of the bicycle when not required for use, and in order to hold the said legs in this raised position I provide on the frame a clip 26, as shown in detail in Fig. 9, said clip comprising a clamping band or ring having at its upper part a transverse bar 27, the ends of which are bent up and over, as shown at 28, to form pockets, into which the ends of said rods or legs 11 may be inserted when raised.

In using the device the rods or legs 11 are disengaged from the clip 26 and allowed to assume a vertical or inclined position, as seen in Fig. 1, the shaft 7 being turned by means of its crank 15 in such a way as to adjust said legs or rods more or less up or down. The dog 24 is then operated to press the brake-shoe 22 into engagement with the wheel-tire, so as to hold the front wheel of the bicycle against movement.

As stated above, the device may be applied to any part of the bicycle-frame for use, but when secured to a part thereof other than the head I prefer to employ a construction similar to the construction shown in Figs. 6, 7, and 8.

As shown in Fig. 6, the clamp-frame 2 is dispensed with and a clamping ring or band $3^a$ is employed in lieu thereof, being provided with sleeves $5^a$, arranged at angles to each other on its opposite sides and pivotally or otherwise secured to said ring or band $3^a$. The sleeves $5^a$ hold the legs or rods $11^a$ and are provided with set-screws $5^b$, whereby said legs may be adjusted longitudinally.

As shown in Figs. 7 and 8, the clamping ring or band $3^b$ has a bearing $4^a$ secured to its upper side and adapted to receive lugs $5^e$ in the sleeves $5^c$, which are provided with set-screws $5^d$ to hold the rods or legs $11^b$ in place. The lugs $5^e$ are overlapped or mortised together at their ends, and said overlapped parts are circumferentially grooved, as shown at $5^f$, to receive the top of set-screws $4^b$ in the bearing $4^a$, so that said lugs are locked together while free to turn in said bearing. A set-screw $4^c$ is employed to hold the legs in place after they have been adjusted.

The device constructed as above described is extremely simple and inexpensive and is well adapted for use for supporting bicycles, since it is adapted to be conveniently applied to and detached from bicycles of all kinds and when in place does not interfere in any way with the operation of the machine.

It will be obvious from the above description that the device is susceptible of considerable modification without material departure from the principles and spirit of my invention, and for this reason I do not wish to be understood as limiting myself to the exact form of the device herein set forth.

Having thus described my invention, I claim as new and desire to secure by Letters Patent—

1. In a bicycle-holder, the combination of a clamp to be secured to the frame of the bicycle, a tubular bearing thereon, a set-screw in said bearing, sleeves having lugs engaging the said bearing and provided with overlapped and circumferentially-grooved ends engaged by said set-screw, rods slidable in said sleeves and means for adjustably securing said rods in said sleeves, substantially as set forth.

2. In a bicycle-holder, the combination of a clamp to be secured to the frame of the bicycle, a tubular transverse bearing thereon, sleeves having lugs turning in said bearing, said lugs being connected and arranged to turn together, rods slidable in the sleeves, and means for securing said rods adjustably in the sleeves, said rods being adapted, when the sleeves are swung pivotally, to fold along the frame of the bicycle, substantially as set forth.

3. In a bicycle-holder, the combination of a clamp to be secured to the frame of the bicycle, sleeves pivoted at opposite sides thereof and connected and arranged to swing together, a shaft arranged to turn on the frame and provided with a crank and having gears at opposite ends, and rods arranged to play through the sleeves and provided with longitudinal rack-faces engaged by said gears on the ends of the shaft, substantially as set forth.

JOHN F. BENGERT.

Witnesses:
J. D. CAPLINGER,
C. SEDGWICK.